United States Patent
Benck

(10) Patent No.: US 6,657,719 B1
(45) Date of Patent: Dec. 2, 2003

(54) FIBER OPTIC TOMOGRAPHIC PLASMA UNIFORMITY MONITOR

(75) Inventor: Eric C. Benck, Montgomery Village, MD (US)

(73) Assignee: The United States of America as represented by the Department of Commerce, Washington, DC (US)

( * ) Notice: Subject to any disclaimer, the term of this patent is extended or adjusted under 35 U.S.C. 154(b) by 341 days.

(21) Appl. No.: 09/633,809

(22) Filed: Aug. 7, 2000

Related U.S. Application Data
(60) Provisional application No. 60/164,280, filed on Nov. 9, 1999.

(51) Int. Cl.[7] .................................................. G01J 3/443
(52) U.S. Cl. .............................. 356/311; 216/60; 438/9
(58) Field of Search ................................ 216/60; 438/9, 438/16, 70; 156/345.35; 356/311, 417

(56) References Cited

U.S. PATENT DOCUMENTS 4,386,854 A * 6/1983 Byer ....................... 250/338.5
4,585,948 A * 4/1986 Schneider et al. ........ 250/208.1
6,297,064 B1 * 10/2001 Koshimizu ................... 216/60

* cited by examiner

Primary Examiner—Richard A. Rosenberger
Assistant Examiner—Vincent P. Barth
(74) Attorney, Agent, or Firm—Arent Fox Kinter Plotkin & Kahn, PLLC

(57) ABSTRACT

A device for analyzing plasma enclosed in a chamber. The device has a lens array which has a plurality of lens array lenses. The lens array lenses are located in a position so that the line of sight for each lens array lens intersects one another at a single point in front of the lens array. Each lens array lens is also located in a position so that each lens array lens is focused near a rear wall of the chamber. Behind each lens array lens is a cable having a first end and a second end. The first end of the cable is located in a position to receive emission elements through the lens array lens. A collimating lens is located at the second end of the cable to couple the emission elements from the second end of the cable through a wavelength selective element. A recording device is located in a position to record the emission elements through the wavelength selective element.

18 Claims, 4 Drawing Sheets

41 MEASUREMENTS

41 MEASUREMENTS

FIBER OPTIC TOMOGRAPHIC PLASMA UNIFORMITY MONITOR

CROSS-REFERENCE TO RELATED APPLICATIONS

This application claims priority from U.S. provisional patent application Ser. No. 60/164,280, filed Nov. 9, 1999. The contents of this provisional patent application is hereby incorporated by reference.

BACKGROUND OF THE INVENTION

1. Field of the Invention

The present invention drawn to a plasma etching process of a semiconductor wafer. More specifically, the present invention is drawn to the monitoring and analysis of plasma to detect any problems encountered in the etching process.

2. Description of Related Art

In a standard plasma etching process of a semiconductor wafer, plasma is placed in a chamber which is usually a cylindrical vacuum chamber. A semiconductor wafer to be etched is placed at one end of the chamber and an electrical current is run through the plasma. As the wafer is being etched, the success of the etching can be determined by monitoring and recording emission elements emitted from the plasma.

A typical commercial vacuum chamber is made of stainless steel or aluminum. These chambers usually have one or more small windows which are approximately one inch in diameter. Since it is very difficult to take measurements through such small windows, special chambers have been developed to obtain the tomography of the plasma. The manufacture of these specialized chambers can be costly.

The invention of the present application eliminates the need to manufacture specialized vacuum chambers in order to determine the tomography of the plasma. This is accomplished by utilizing the existing windows found in typical commercial vacuum chambers to take proper tomographical measurements of the plasma. This will eliminate the need to manufacture specialized chambers saving time and money.

BRIEF SUMMARY OF THE INVENTION

In one embodiment of the invention a device for monitoring emission elements emitted from a chamber has a lens array located in a position to receive emission elements from a chamber. The lens array has a plurality of lens array lenses. Each of the lens array lenses has a line of sight intersecting one another at a single point in front of the lens array.

A method for monitoring emission elements emitted from a chamber includes the steps of receiving emission elements through a lens array having a plurality of lens array lenses and positioning each of said lens array lenses so that each lens array lens line of sight intersects one another at a single point in front of the lens array.

DETAILED DESCRIPTION OF THE PREFERRED EMBODIMENTS

Figure 1:
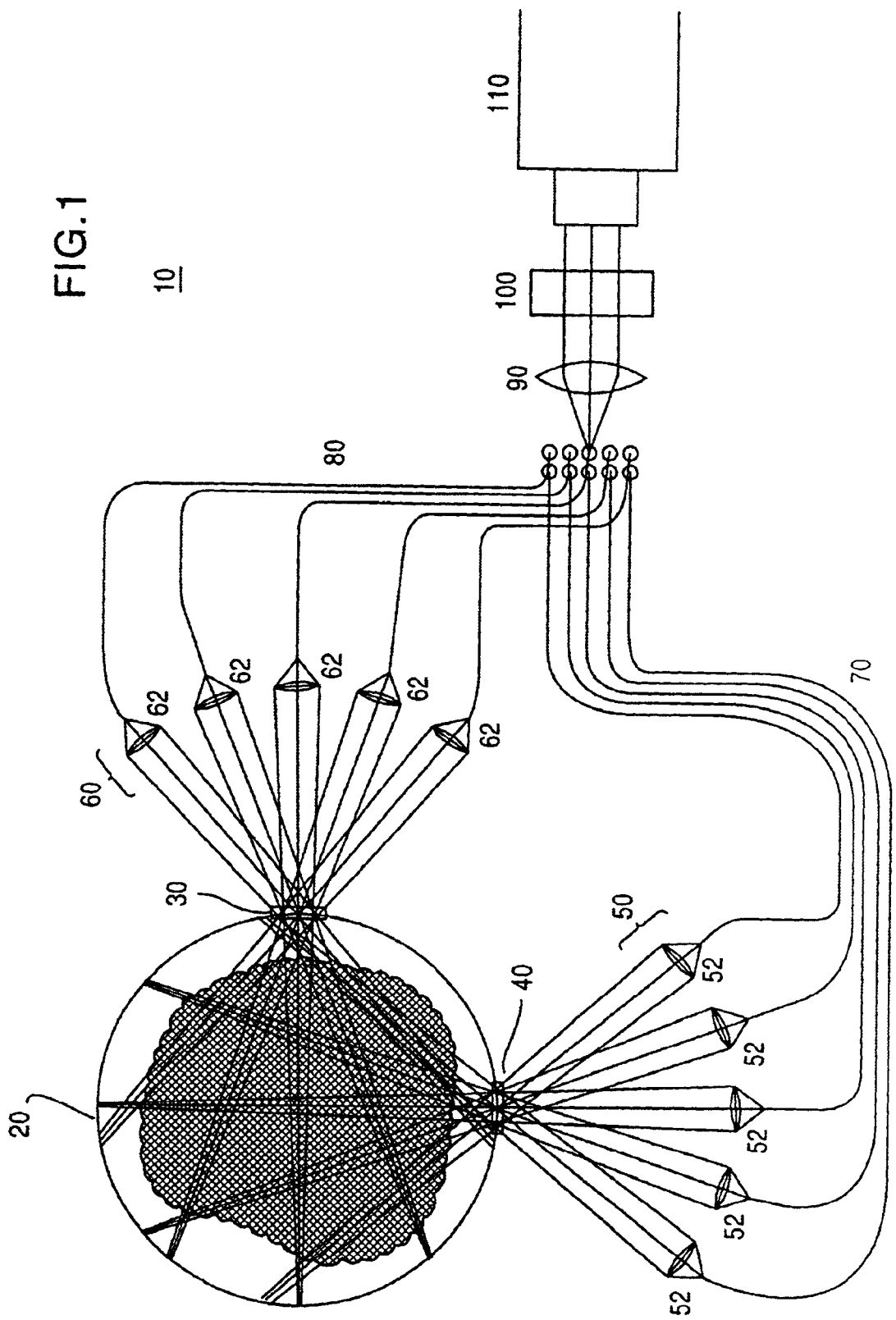
FIG. 1 is a schematic diagram of a fiber optic tomographic plasma uniformity monitor according to the invention.

FIG. 1 illustrates one embodiment of the invention. Monitor 10 has a chamber 20. There are two windows 30 and 40 located along the perimeter of chamber 20. A first lens array 50 has lens array lenses 52 located in a position so that they can couple emission elements emitted from window 30 to cables 70. A second lens array 60 has lens array lenses 62 located in a position so that they can couple emission elements emitted from window 40 to cables 80. A lens 90 is located in a position to couple the emission elements from cables 70 and 80 through a wavelength selective element 100 to a recording device 110.

Chamber 20 in one embodiment of the invention is a vacuum chamber for holding plasma and a semiconductor substrate. As the semiconductor substrate is etched, the plasma in chamber 20 emits optical emission elements through windows 30 and 40. Lens arrays 50 and 60 are made up of lens array lenses 52 and 62, respectively, which couple the optical emission elements emitted from windows 30 and 40 to cables 70 and 80 respectively. It is noted that lens array lenses 52 do not have to be a plurality of lenses but can be a single lens. Likewise lens array lenses 62 do not have to be a plurality of lenses but can be a single lens.

Windows 30 and 40 in one embodiment of the invention are circular in shape and can be about one inch in diameter. However the invention is not limited to these dimensions and the windows could have other sizes and/or shapes. The advantage of having more than one window with more than one lens array is that the processing speed is increased since the emission elements are being sent simultaneously through more than one lens array. Another advantage is that a better cross section of the plasma can be tested since the emission elements emitted from the plasma are being taken from two different areas. If measurements are taken only from one lens array, assumptions must be made with regard to the symmetry of the plasma. However, when getting measurements from more than one lens array, assumptions with regard to symmetry of the plasma do not have to be made, and more accurate readings and analysis can be made.

Figure 2:
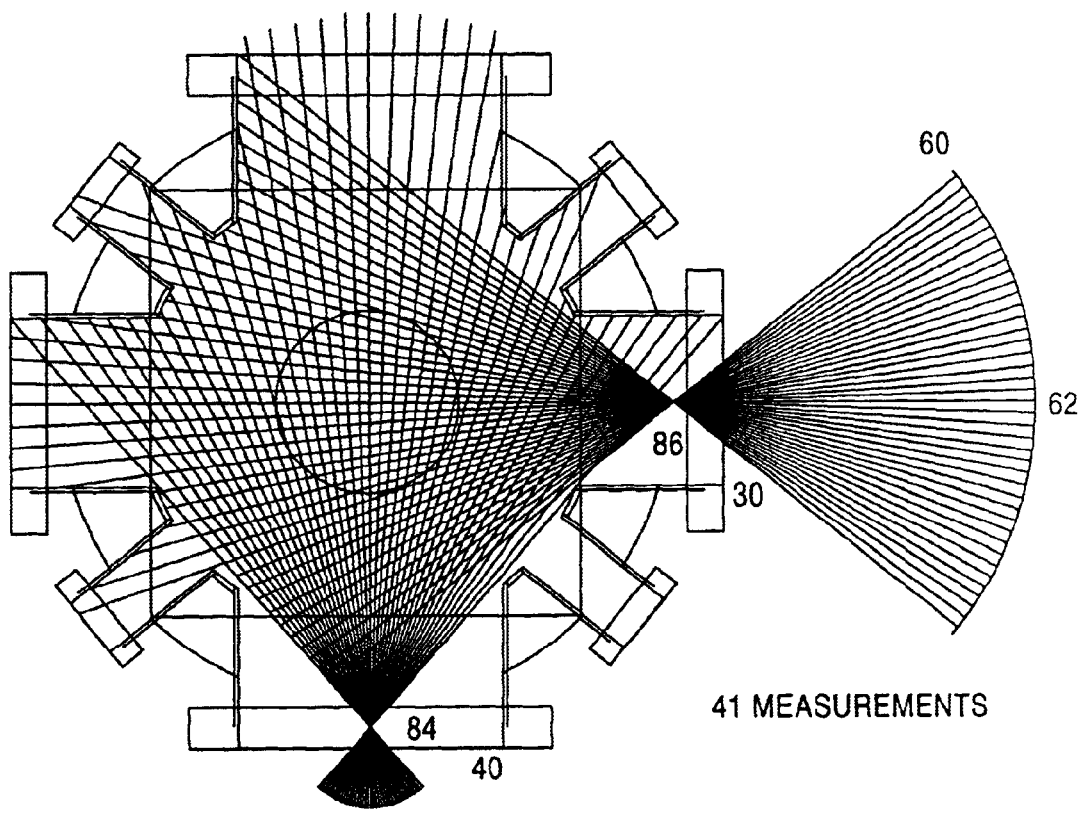
FIG. 2 is a schematic diagram of a fiber optic tomographic plasma uniformity monitor according to the invention wherein the line of sight for each of the lens array lenses intersects at a single point on a window of a chamber.

FIG. 2 depicts two lens arrays 50 and 60. Lens array 50 has 41 lens array lenses 52 and lens array 60 has 41 lens array lenses 62. Each of the 41 lens array lenses 52 are located in a position so that the line-of-sight of each of the lens array lenses 52 intersect at a single point 84 in front of lens array 50 and each of the 41 lens array lenses 62 are located in a position so that the line-of-sight of each lens array lens 62 intersect at a single point 86 in front of the lens array 60. In one embodiment of the invention the intersection points 84 and 86 are located on each window 40 and 30 (as depicted) respectively in order to keep the window diameter as small as possible. In an alternate embodiment, the intersection point can be located within the vacuum chamber itself (not depicted) in order to optimize the plasma volume measured.

The optics of the of lens array lenses 52 and 62 are designed to be focused near the rear wall of the vacuum chamber. This enables problems with light reflected off the rear wall to be more easily identified. It is also helpful for the optics for each lens array channel to be identical so that the light collection efficiency and the light collection volume of each channel is the same.

Cables 70 and 80 in one embodiment of the invention are fiber optic cables. In other embodiments cable 70 is a single fiber optic cable having segments of the cable associated with each lens in the lens array 50 and cable 80 is a single fiber optic cable having segments of the cable associated with each lens in the lens array 50. Alternatively a single fiber optic cable would be associated with each lense in lens arrays 50 and 60. Other cable configurations are also possible.

Lens 90 couples the optical emission elements from cables 70 and 80 through a wavelength selective element 100 to a recorder 110. Lens 90 also serves to collimate optical emission elements from cables 70 and 80.

Wavelength selective element 100 in one embodiment of the invention can be an electronic tunable optical filter or an interference filter. In an alternate embodiment wavelength selective element 100 is a parallel plate etalon capable of being used for higher spectral resolution.

In one embodiment of the invention recording device 110 is a digital camera. In an alternate embodiment recording device 110 is a CCD camera. Other recording devices can also be used, depending upon display and storage requirements. Recording device 110 can also be mounted on a kinematic mount (not depicted) so that it can be easily removed and a light source (not depicted) put in its place to help align lens arrays 50 and 60 with the plasma source.

It is noted that in order to speed up the processing time it is important that the emission elements emitted from cables 70 and 80 be simultaneously imaged with recording device 110. Data can also be collected, depending upon the recording device used as recording device 110, for time-resolved tomographic images of the plasma.

Figure 3:
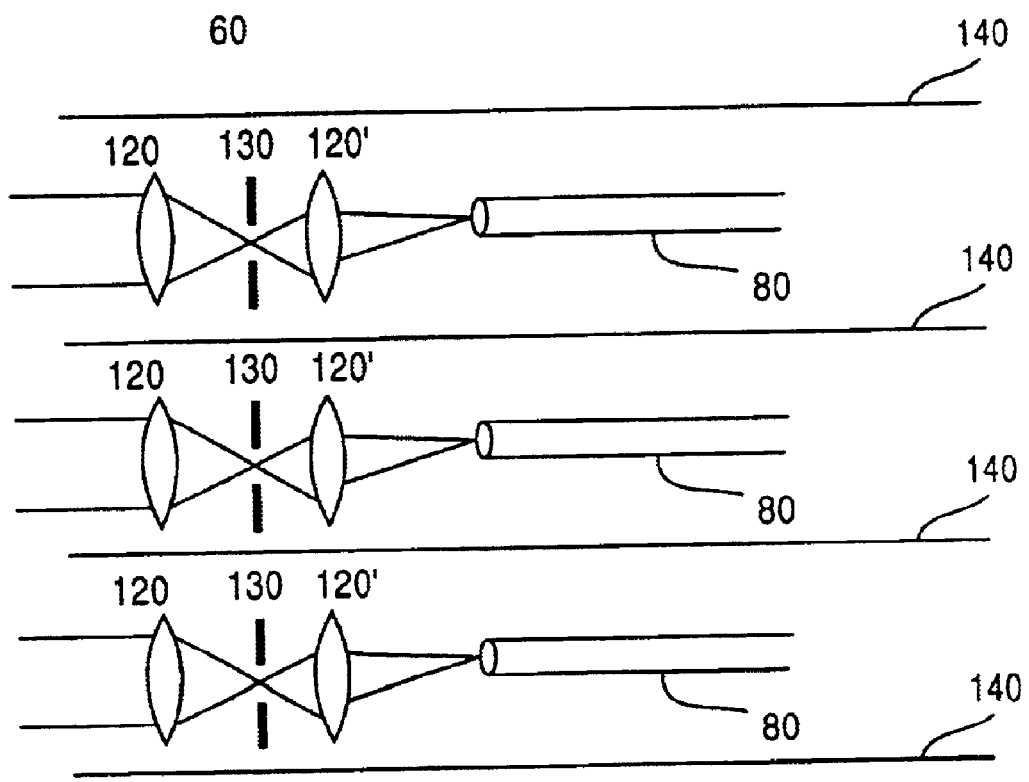
FIG. 3 is a top view of an embodiment of a lens array having two lenses to focus emission elements onto a cable according to the invention.

FIG. 3. depicts a lens array 60 having two lens array lenses 120 and 120' to focus emission elements onto cable 80. Located between lens array lens 120 and lens array lens 120' is an aperture 130 which assists in eliminating scattered light between lens array lens 120 and lens array lens 120'. Baffles 140 are also located between each pair of lenses 120 and 120' to prevent light from traveling through the wrong pair of lenses.

Figure 4:
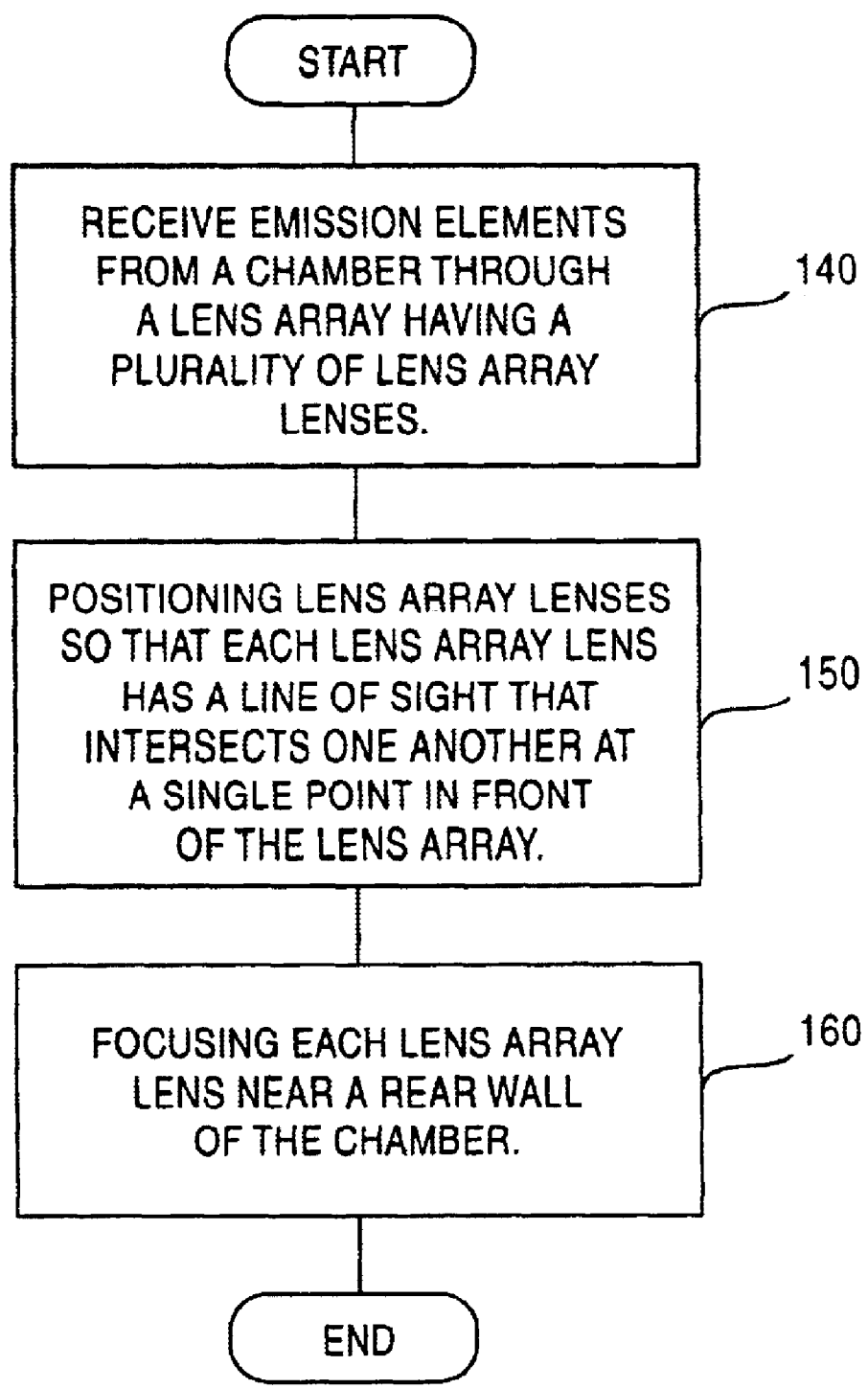
FIG. 4 is a flow chart showing a sequence of steps used to monitor plasma uniformity according to the invention.

FIG. 4 is a flow chart showing a sequence of steps used to monitor plasma uniformity according to the invention. In the first step, 150 emission elements are received from a chamber through a lens array having a plurality of lens array lenses. It is noted that emission elements can also be received by more than one lens array. In the next step, 160 the lens array lenses are positioned so that each lens array lens has a line of sight that intersects one another at a single point in front of the lens array. In step 170, each lens array lens is positioned so that it is focused near a rear wall.

Although the present invention has been described and illustrated in detail, it is clearly understood that the embodiments described herein are merely exemplary and that variations and modifications may be made to the invention without departing from the spirit and scope of the invention. All such variations and modifications are intended to be included within the scope of the invention in the present application.

I claim:

1. A device for monitoring emission elements emitted from a material processing plasma etching chamber comprising:
   a lens array located in a position to receive the emission elements from the chamber, said lens array having a plurality of lens array lenses, each of said lens array lenses having a line of sight intersecting one another at a single point in front of said lens array;
   wherein optical characteristics of said lens array lenses are designed to be focused near a rear wall of the chamber.

2. A device for monitoring emission elements as claimed in claim 1 comprising more than one lens array.

3. A device for monitoring emission elements as claimed in claim 1 wherein optical characteristics of said lens array lenses are identical.

4. A device for monitoring emission elements emitted from a material processing plasma etching chamber comprising:
   a lens array located in a position to receive the emission elements from the chamber, said lens array having a plurality of lens array lenses, each of said lens array lenses having a line of sight intersecting one another at a single point in front of said lens array;
   wherein said line of sight intersects on a window on the chamber.

5. A device for monitoring emission elements emitted from a material processing plasma etching chamber comprising:
   a lens array located in a position to receive the emission elements from the chamber, said lens array having a plurality of lens array lenses, each of said lens array lenses having a line of sight intersecting one another at a single point in front of said lens array;
   wherein said line of sight intersects within the chamber.

6. A device for monitoring emission elements emitted from a material processing plasma etching chamber comprising:
   a lens array located in a position to receive the emission elements from the chamber, said lens array having a plurality of lens array lenses, each of said lens array lenses having a line of sight intersecting one another at a single point in front of said lens array; and
   a plurality of cables having a first end and a second end, each of said first ends of said cables located in a position behind each of said lens array lenses to receive the emission elements through said lens array lenses.

7. A device for monitoring emission elements as claimed in claim 6 wherein said cables are fiber optic cables.

8. A device for monitoring emission elements as claimed in claim 6 further comprising:
   a collimating lens located in a position to couple the emission elements transmitted through said second ends of said cables through a wavelength selective element.

9. A device for monitoring emission elements as claimed in claim 8 wherein said wavelength selective element is an electronic tunable optical filter.

10. A device for monitoring emission elements as claimed in claim 8 wherein said wavelength selective element is an interference filter.

11. A device for monitoring emission elements as claimed in claim 8 wherein said wavelength selective element is a parallel plate etalon.

12. A device for monitoring emission elements as claimed in claim 8 further comprising:
   a recording device configured to record data transmitted through said wavelength selective element.

13. A device for monitoring emission elements as claimed in claim 12 wherein said recording device comprises a CCD camera.

14. A device for monitoring emission elements as claimed in claim 12 wherein said recording device comprises a digital camera.

15. A device for monitoring emission elements as claimed in claim 12 wherein said recording device is removably mounted on a kinematic mount.

16. A device for monitoring emission elements as claimed in claim 8 further comprising:
   a light source configured to transmit light through said wavelength selective element, said collimating lens, said plurality of cables and each of said lens array lenses in order to align said lens array lenses.

17. A method for monitoring emission elements emitted from a material processing plasma etching chamber, the method comprising:
   receiving emission elements through a lens array having a plurality of lens array lenses;
   positioning each of said lens array lenses so that each lens array lens line of sight intersects one another at a single point in front of said lens array; and
   focusing each of said lens array lenses near a rear wall of the chamber.

18. A method for monitoring emission elements emitted from a chamber as claimed in claim 17 wherein said emission elements are received through a plurality of lens arrays.

* * * * *